F. H. HARM.
OPTICAL TRIAL FRAME HOLDER.
APPLICATION FILED APR. 18, 1919.

1,328,669.

Patented Jan. 20, 1920.

INVENTOR:
F. H. Harm.
BY his ATTORNEY:
A. M. Carlsen.

UNITED STATES PATENT OFFICE.

FREDERICK H. HARM, OF ST. PAUL, MINNESOTA.

OPTICAL TRIAL-FRAME HOLDER.

1,328,669.  Specification of Letters Patent.  Patented Jan. 20, 1920.

Application filed April 18, 1919. Serial No. 291,134.

*To all whom it may concern:*

Be it known that I, FREDERICK H. HARM, a citizen of the United States, residing at St. Paul, in the county of Ramsey and State of Minnesota, have invented a new and useful Optical Trial-Frame Holder, of which the following is a specification.

My invention relates to trial frame holders used by opticians for holding the lenses through which a patient must look at some distant object in testing his eyesight as to the lenses he may need.

Heretofore such trial frame holders have been made with means for mounting them either on a wall or on the nose, or on the head of the patient, but in either case the devices have been inconvenient, and without satisfactory means for maintaining or regulating the angular relation of the lens to the eye, but mainly for changing the distance of the lenses from the eyes.

The object of my invention is to remedy the above mentioned defects with trial frame holders.

In the accompanying drawing:—

Figure 1:
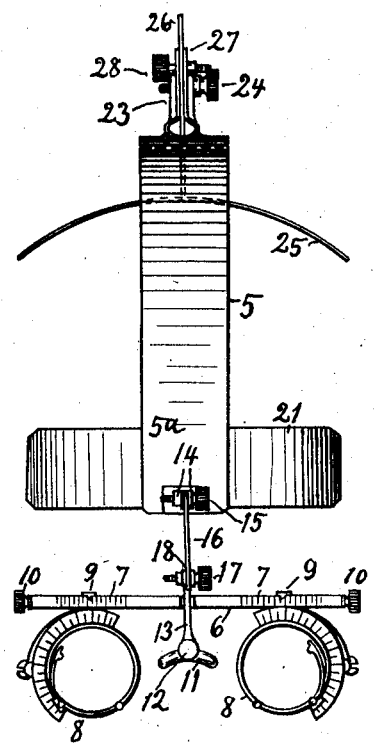
Figure 2:
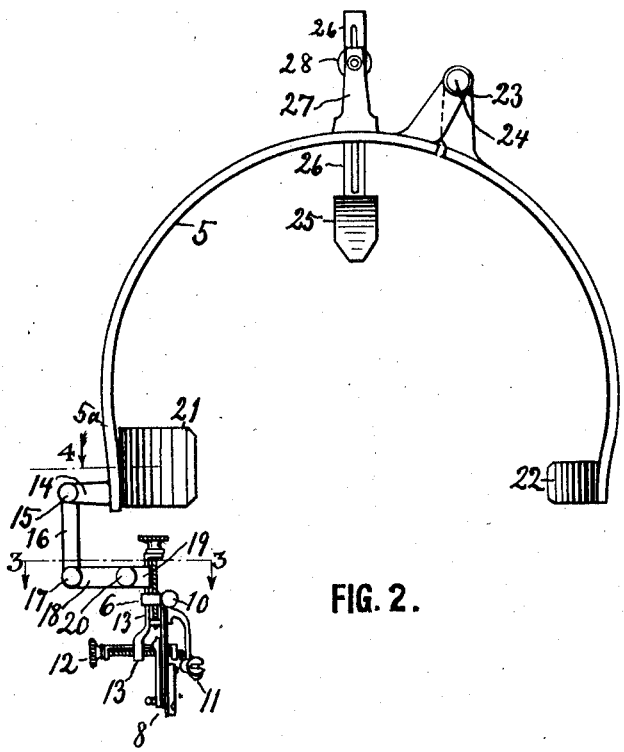
Figure 3:
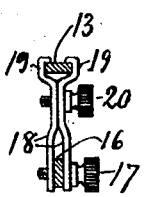
Figure 4:
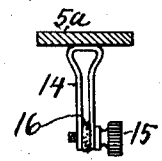

Figure 1 is a front elevation of my improved trial frame holder. Fig. 2 is a side elevation of Fig. 1. Fig. 3 is a section on the line 3—3 in Fig. 2. Fig. 4 is a section on the line 4—4 in Fig. 2.

Referring to the drawing by reference numerals, 5 designates a skeleton hood or clasp adapted to be placed upon the head of the person whose eyes are to be tested, and 6 is the usual bar held by the clasp and having scales 7. On said bar are slidably mounted the lens holders or trial frames 8, each of which has an arm 9 with a pointer movable along the adjacent scale 7, when the frames are closed or spread by a right and left threaded screw 10 threaded in said arms and journaled to the rear side of the bar 6, or two screws may be used, one moving each arm 9. The bar 6 is provided with a nose rest 11 having an adjustment screw 12 threaded in a vertical arm 13 fixed on bar 6. The parts so far described in a general way I do not claim as new: My invention will now be described.

To the front end 5ᵃ of the hood 5 I fix a bifurcated bracket 14, in which is pivoted and clamped by a screw 15 a vertically disposed link 16, to the lower end of which are pivoted and clamped by a screw 17 the forward end of two flat bars or arms 18, whose rear ends form gripping jaws or a clamp 19, which by a screw 20 are drawn firmly against the edges of the arm 13, the latter being thus adjustable up and down in said clamp 19.

The hood consists mainly of an arch 5, which may be made of resilient material, so as to clasp the head between the two pads or plates 21 and 22, but in order to make it fit small and large heads properly, I prefer to also give it a joint 23 having a clamping screw 24 by which it may be tightened after the pads 21—22 have reached the desired proximity to each other.

I also provide the top of the hood with a plate 25 adapted to rest on the top of the head. Fixed on said pad or rest 25 is a flat slotted upright 26, slidable in a bifurcated bracket 27, which is fixed upon the hood and provided with a clamping screw 28 by which the upright may be clamped in the bracket in any desired raised or lowered position.

In the operation or use of the device the hood is placed upon the head and adjusted and the support 25 adjusted and secured by the screw 28 with the trial frames 8 as near as possible the right height in front of the eyes. The frames 8 and bar 6 are then swung at the joint or screw 15 to get the lenses the proper distance from the eyes, and at the joint or screw 17 to give the lenses the proper angle to the line of vision. This being done, the lenses are placed in the frames 8 and observation made as usual.

What I claim is:—

1. In a device of the kind described, a skeleton hood adapted to be adjusted upon a person's head and having at the front a bracket, a vertically disposed link pivotally clamped with its upper end to the bracket, a horizontally disposed arm pivotally clamped with the front end to the lower end of the link, a vertical rod slidably secured in the rearward end of the horizontal arm, and a horizontal bar operatively connected with the vertical rod, and a pair of trial frames mounted on said horizontal bar.

2. The structure specified in claim 1, said horizontal arm having at its rearward end clamping members with a screw through them for clamping the vertical rod in any position to which it may be adjusted.

In testimony whereof I affix my signature.

FREDERICK H. HARM.